US011978979B2

(12) United States Patent
Tsukamoto

(10) Patent No.: US 11,978,979 B2
(45) Date of Patent: May 7, 2024

(54) CONNECTOR AND WIRING HARNESS WITH CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Yuya Tsukamoto, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 350 days.

(21) Appl. No.: 17/294,162

(22) PCT Filed: Oct. 31, 2019

(86) PCT No.: PCT/JP2019/042711

§ 371 (c)(1),
(2) Date: May 14, 2021

(87) PCT Pub. No.: WO2020/105387

PCT Pub. Date: May 28, 2020

(65) Prior Publication Data

US 2022/0013952 A1 Jan. 13, 2022

(30) Foreign Application Priority Data

Nov. 19, 2018 (JP) ................................. 2018-216165

(51) Int. Cl.
*H01R 13/52* (2006.01)
*H01B 7/00* (2006.01)

(52) U.S. Cl.
CPC ....... *H01R 13/5221* (2013.01); *H01B 7/0045* (2013.01)

(58) Field of Classification Search
CPC .............. H01B 7/0045; H01R 13/5221; H01R 13/5205
See application file for complete search history.

(56) References Cited

U.S. PATENT DOCUMENTS

| | | | | |
|---|---|---|---|---|
| 7,632,148 B1 | 12/2009 | Kawamura et al. | | |
| 7,959,469 B2 * | 6/2011 | Kawamura ........ | H01R 13/6593 439/573 | |

(Continued)

FOREIGN PATENT DOCUMENTS

JP 2017-112031 A 6/2017

OTHER PUBLICATIONS

International Search Report dated Dec. 24, 2019 for WO 2020/105387 A1 (2 pages).

*Primary Examiner* — Marcus E Harcum
(74) *Attorney, Agent, or Firm* — Venjuris, P.C.

(57) ABSTRACT

It is aimed to provide a connector which can be thinned. A connector is connected to a mating connector in a height direction and includes a wire insertion portion open in a direction orthogonal to the height direction, a wire member being partially inserted into the wire insertion portion, a connector opening open in the height direction, a terminal member of the mating connector being insertable into the connector opening to be electrically connectable to the wire member, and a connector fitting portion to be fit to the mating connector. A range H2 in the height direction of a connector sealing member for sealing between the connector fitting portion and the mating connector is set to at least partially overlap within a range H1 in the height direction of (Continued)

a wire sealing member for sealing between the wire member and the wire insertion portion.

9 Claims, 3 Drawing Sheets

(56) References Cited

U.S. PATENT DOCUMENTS

| | | | | |
|---|---|---|---|---|
| 8,562,381 | B2 * | 10/2013 | Kawamura | H01R 4/34 439/801 |
| 9,166,329 | B2 * | 10/2015 | Eckel | H01R 13/533 |
| 9,209,582 | B2 * | 12/2015 | Kashiwada | H01R 13/6315 |
| 9,231,337 | B2 * | 1/2016 | Sakakura | H01R 13/5837 |
| 9,331,440 | B2 * | 5/2016 | Yoshida | H01R 13/504 |
| 9,343,825 | B2 * | 5/2016 | Kashiwada | H01R 4/34 |
| 9,407,027 | B2 * | 8/2016 | Yoshida | H01R 13/504 |
| 9,431,777 | B2 * | 8/2016 | Horiuchi | H01R 13/6273 |
| 9,496,637 | B2 * | 11/2016 | Ichio | H01R 13/5812 |
| 9,496,643 | B2 | 11/2016 | Kato et al. | |
| 9,674,994 | B2 * | 6/2017 | Yoshida | H01B 7/04 |
| 9,819,120 | B2 * | 11/2017 | Mukuno | H03H 11/08 |
| 10,873,150 | B2 * | 12/2020 | Miyazawa | H01R 13/405 |
| 10,903,599 | B2 * | 1/2021 | Lienert | H02G 15/046 |
| 2004/0266265 | A1 * | 12/2004 | Hayashi | H01R 13/6593 439/607.53 |
| 2004/0266269 | A1 * | 12/2004 | Miyazaki | H01R 13/512 439/660 |
| 2012/0100752 | A1 | 4/2012 | Ooki | |
| 2013/0140075 | A1 * | 6/2013 | Akuta | H02G 3/32 174/382 |
| 2014/0120763 | A1 * | 5/2014 | Itsuki | H01R 13/533 439/382 |
| 2017/0302019 | A1 * | 10/2017 | Horiuchi | H01R 13/6581 |
| 2018/0090873 | A1 * | 3/2018 | Masuda | H01R 13/5221 |
| 2018/0269624 | A1 * | 9/2018 | Iwabe | H01R 13/6215 |
| 2018/0309245 | A1 | 10/2018 | Iida et al. | |
| 2019/0190211 | A1 * | 6/2019 | Yamanashi | H01R 13/6592 |

* cited by examiner

CONNECTOR AND WIRING HARNESS WITH CONNECTOR

CROSS REFERENCE TO RELATED APPLICATIONS

This application is a national phase of PCT application No. PCT/JP2019/042711, filed on 31 Oct. 2019, which claims priority from Japanese patent application No. 2018-216165, filed on 19 Nov. 2018, all of which are incorporated herein by reference.

TECHNICAL FIELD

The present invention relates to a connector and a wiring harness with connector.

BACKGROUND

Conventionally, an L-shaped tubular connector including a wire insertion portion open in a direction orthogonal to a height direction and configured such that a wire member is partially inserted thereinto and a connector opening open in the height direction and configured such that a terminal member of a mating connector is insertable thereinto to be electrically connectable to the wire member is known as a connector of a wiring harness with connector (see, for example, Patent Document 1).

PRIOR ART DOCUMENT

Patent Document

Patent Document 1: JP 2015-076139 A

SUMMARY OF THE INVENTION

Problems to be Solved

However, if an attempt is made to provide sealing structures on both the wire insertion portion side and the connector opening side in the simple L-shaped tubular connector as described above, it becomes difficult to thin the connector, such as due to the stacking of the sealing structures in the height direction (opening direction of the connector opening).

The present invention was developed to solve the above problem and aims to provide a connector and a wiring harness with connector which can be thinned.

Means to Solve the Problem

A connector for solving the above connector is a connector to be connected to a mating connector in a height direction and includes a wire insertion portion open in a direction orthogonal to the height direction, a wire member being partially inserted into the wire insertion portion, a connector opening open in the height direction, a terminal member of the mating connector being insertable into the connector opening to be electrically connectable to the wire member, and a connector fitting portion to be fit to the mating connector, a range in the height direction of a connector sealing member for sealing between the connector fitting portion and the mating connector being set to at least partially overlap within a range in the height direction of a wire sealing member for sealing between the wire member and the wire insertion portion.

According to this configuration, since the range in the height direction of the connector sealing member for sealing between the connector fitting portion and the mating connector is set to at least partially overlap within the range in the height direction of the wire sealing member for sealing between the wire member and the wire insertion portion, a height of the connector can be reduced and the connector can be thinned.

A wiring harness with connector for solving the above problem includes the above connector and a wire member.

According to this configuration, the height of the connector can be reduced in the wiring harness with connector and the wiring harness with connector can be thinned.

In the above wiring harness with connector, the range in the height direction of the connector sealing member is preferably set to at least partially overlap within a range in the height direction of the wire member inserted in the wire insertion portion.

According to this configuration, since the range in the height direction of the connector sealing member is set to at least partially overlap within the range in the height direction of the wire member inserted in the wire insertion portion, the height of the connector can be reduced and the wiring harness with connector can be thinned.

Preferably, the above wiring harness with connector includes a connector terminal arranged on a back side of the connector opening, the wire member being electrically connected to the connector terminal, the terminal member of the mating connector being brought into contact with the connector terminal, and the connector terminal is in the form of a flat plate and arranged such that a plate thickness direction of the connector terminal is aligned with the height direction.

According to this configuration, since the connector terminal is in the form of a flat plate and so arranged that the plate thickness direction thereof is aligned with the height direction, the height of the connector can be reduced and the wiring harness with connector can be thinned while a cross-sectional area of the connector terminal is secured. Note that the cross-sectional area of the connector terminal is an area of a surface of the connector terminal cut by a plane orthogonal to a direction of a current flowing in the connector terminal. A minimum cross-sectional area of the connector terminal at which abnormal heat generation and the like do not occur is determined according to the amount of a flowing current. Unless such a minimum cross-sectional area is considered, the height of the connector can also be reduced, simply using a thin wire material or the like as the connector terminal. In contrast, in the above configuration, the height of the connector can be reduced and the wiring harness with connector can be thinned while the minimum cross-sectional area of the connector terminal at which abnormal heat generation and the like do not occur is secured.

In the above wiring harness with connector, preferably, the wire member includes a wire having a core and an insulation coating covering an outer periphery of the core, and the connector terminal is connected to the core on a side of the core distant from the connector opening in the height direction.

According to this configuration, since the connector terminal is connected to the core on the side of the core of the wire member distant from the connector opening in the height direction, a wider space can be secured on a side closer to the connector fitting portion than the connector terminal. Thus, the connector sealing member can be brought closer to a central side of the wire sealing member in the height direction of the wire sealing member. That is, the range in the height direction of the wire sealing member and the range in the height direction of the connector sealing member are more easily overlapped. Therefore, the connector can be more thinned.

In the above wiring harness with connector, preferably, the core includes a circular cross-section portion to be arranged inside the wire insertion portion and a squeezed portion formed on a side closer to a tip than the circular cross-section portion and squeezed into surface contact with the connector terminal in the form of a flat plate, and the squeezed portion is formed to be flush with a surface of the circular cross-section portion on the side distant from the connector opening in the height direction.

According to this configuration, since the squeezed portion of the core is formed to be flush with the surface of the circular cross-section portion distant from the connector opening in the height direction, a wider space can be secured on the side closer to the connector fitting portion than the connector terminal. Thus, the connector sealing member can be brought closer to the central side of the wire sealing member in the height direction of the wire sealing member. That is, the range in the height direction of the wire sealing member and the range in the height direction of the connector sealing member are more easily overlapped. Therefore, the connector can be more thinned.

Effect of the Invention

The connector and the wiring harness with connector of the present invention can be thinned.

DETAILED DESCRIPTION TO EXECUTE THE INVENTION

Hereinafter, one embodiment of a wiring harness with connector is described with reference to FIGS. 1 to 3. Note that, in each figure, some components may be shown in an exaggerated or simplified manner for the convenience of description. Further, a dimensional ratio of each component may also be different from an actual one.

Figure 1:
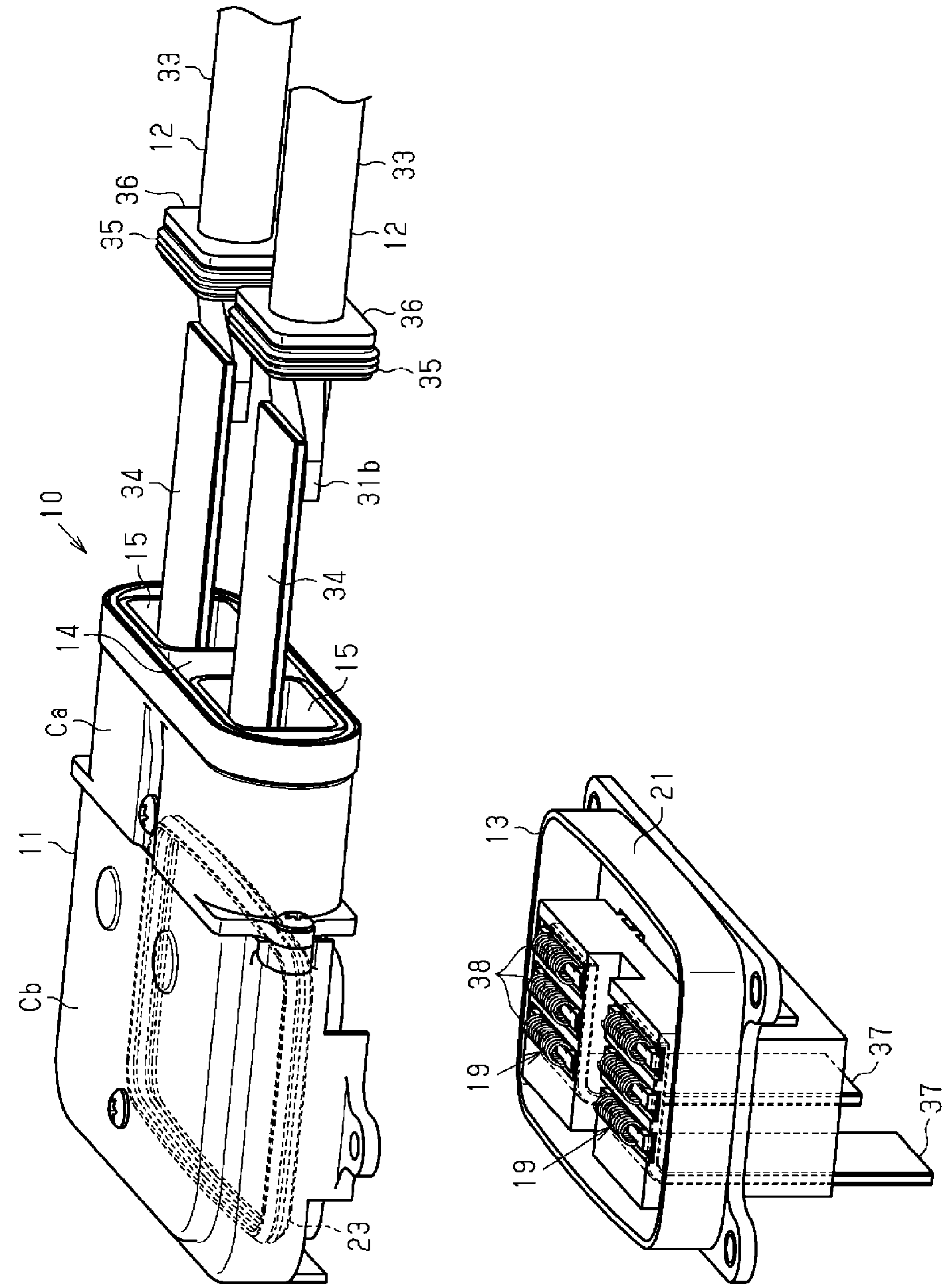
FIG. 1 is a partially exploded perspective view of a wiring harness with connector of one embodiment and a mating connector.
Figure 2:
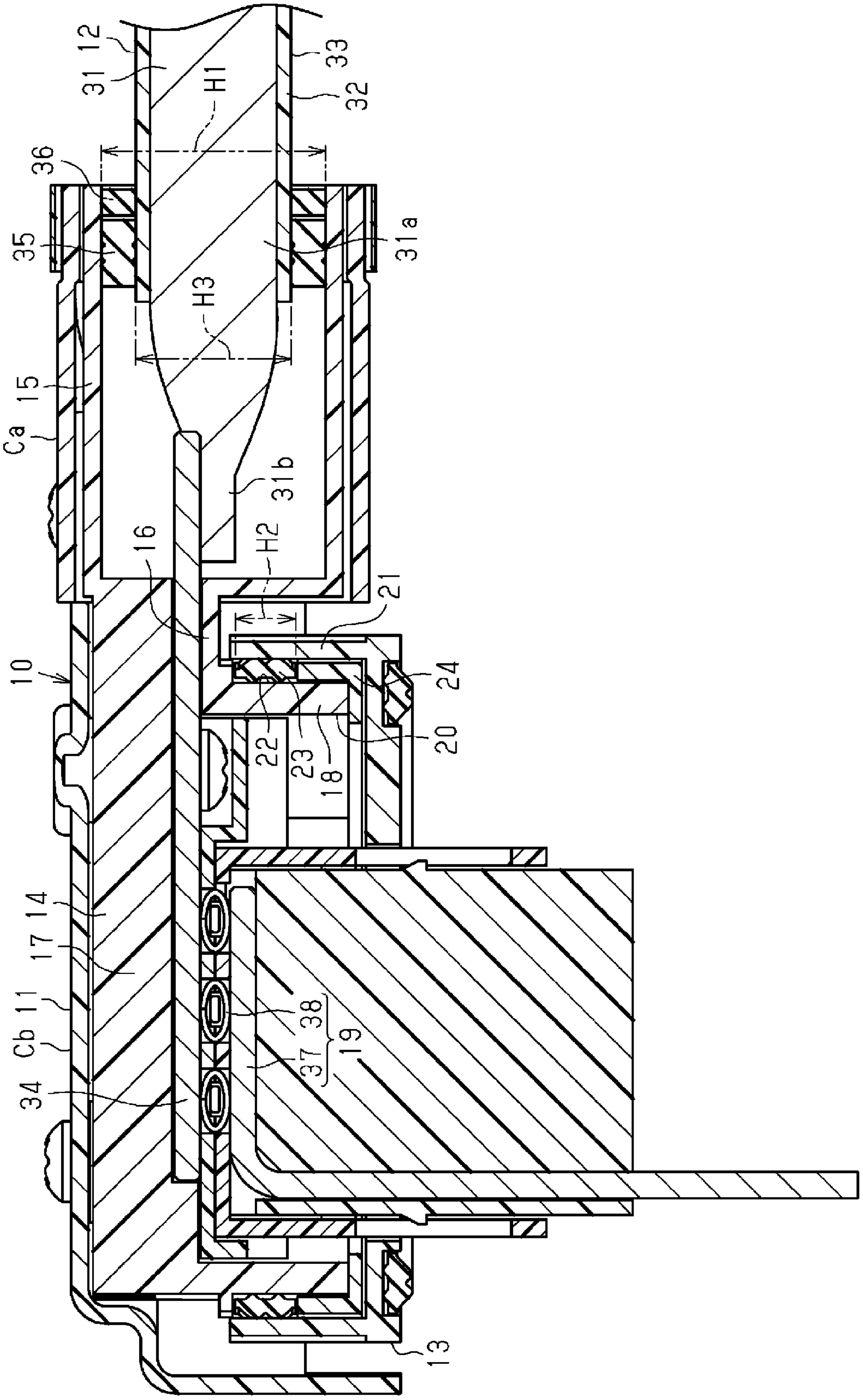
FIG. 2 is a section of the wiring harness with connector of the one embodiment and the mating connector.

As shown in FIGS. 1 and 2, a wiring harness with connector 10 includes a connector 11 and wire members 12. The wiring harness with connector 10 is, for example, connected to a mating connector 13 fixed to an unillustrated electrical device such as an inverter in a height direction. Note that the height direction described in this embodiment is a direction aligned with a connecting direction of the wiring harness with connector 10 to the mating connector 13. Further, a vertical direction in FIGS. 1 to 3 is a direction aligned with the height direction described in this embodiment.

As shown in FIG. 2, the connector 11 includes a connector body 14 and a first cover Ca and a second cover Cb provided to cover outer surfaces of the connector body 14.

The connector body 14 includes wire insertion portions 15, for example, substantially in the form of rectangular tubes which are open in a direction (longitudinal direction of the wire members 12 or longitudinal direction of connector terminals 34 to be described later in a shown example) orthogonal to the height direction (vertical direction in FIG. 2) of the connector 11 and into which tip parts of the wire members 12 are inserted. A pair of the wire insertion portions 15 are provided side by side in parallel in this embodiment. Further, the connector body 14 includes a tubular communicating portion 16 extending toward a side opposite to an insertion side of the wire members 12 while communicating with the pair of wire insertion portions 15. The communicating portion 16 is formed on upper sides of the wire insertion portions 15 in the height direction (upper sides in the vertical direction in FIG. 2). In this embodiment, the lower surface of the lower wall of the communicating portion 16 is formed at substantially center positions of the wire insertion portions 15 in the height direction.

Further, the connector body 14 includes a connector terminal support wall 17 extending from the upper wall of the communicating portion 16 and a coupling tube portion 18 substantially in the form of a rectangular tube extending downward in the height direction (downward in the vertical direction in FIG. 2) from the lower wall of the communicating portion 16 and a peripheral edge part of the connector terminal support wall 17.

The inner surface of the coupling tube portion 18 serves as a connector opening 20 which is open in the height direction (vertical direction in FIG. 2) and into which terminal members 19 of the mating connector 13 are insertable to be electrically connectable to the wire members 12. Further, the outer surface of the coupling tube portion 18 serves as a connector fitting portion 22 to which a mating fitting portion 21 substantially in the form of a rectangular tube provided in the mating connector 13 is to be fit. In particular, in the connector fitting portion 22, a connector sealing member 23 for sealing between the connector fitting portion 22 and the mating fitting portion 21 of the mating connector 13 is provided on a base end side (upper side in FIG. 2) of the connector fitting portion 22. The connector sealing member 23 is, for example, made of a resilient material such as rubber. The connector sealing member 23 is formed into a substantially rectangular tube shape, externally fit to the base end side of the connector fitting portion 22, and held by a seal retainer 24 fit on a tip side (lower side in FIG. 2) of the connector fitting portion 22. The connector 11 is coupled and fixed to the mating connector 13 by the connector fitting portion 22 being so fit to the mating fitting portion 21 that the connector sealing member 23 is pressed into contact with the inner surface of the mating fitting portion 21 in the mating connector 13.

The wire member 12 is a wire 33 including a core 31 as a conductor and an insulation coating 32 covering the outer periphery of the core 31. The connector terminal 34 arranged to be supported on the lower surface of the connector terminal support wall 17 on a back side (upper side in FIG. 2) of the connector opening 20 and to be contacted by the terminal member 19 of the mating connector 13 is electrically connected to the core 31 of the wire member 12. In particular, the connector terminal 34 is in the form of a flat plate and arranged such that a plate thickness direction thereof is aligned with the height direction (vertical direction in FIG. 2). Further, the core 31 includes a circular cross-section portion 31*a* arranged inside an opening end of the wire insertion portion 15 and a squeezed portion 31*b* formed in a part closer to a tip than the circular cross-section portion 31*a*, exposed to outside from the insulation coating 32 and squeezed into surface contact with the connector terminal 34 in the form of a flat plate. That is, the squeezed portion 31*b* has a flat surface capable of coming into surface contact with the connector terminal 34 in the form of a flat plate. The connector terminal 34 is connected and fixed to the squeezed portion 31*b* by resistance welding on a side (i.e. upper side in FIG. 2) of the squeezed portion 31*b* in the core 31 of the wire member 12 distant from the connector opening 20 in the height direction (vertical direction in FIG. 2).

Further, the wire member 12 is provided with a wire sealing member 35 for sealing between the wire member 12 and the wire insertion portion 15. The wire sealing member 35 is, for example, made of a resilient material such as rubber. The wire sealing member 35 is formed to have a circular inner surface and a substantially rectangular outer surface. The wire sealing member 35 is externally fit and fixed at a position corresponding to the wire insertion portion 15 in the wire member 12. Further, a seal retainer 36 is externally fit and fixed at a position corresponding to the opening end of the wire insertion portion 15 in the wire member 12. A tip side of the wire member 12 is so inserted into the wire insertion portion 15 that the connector terminal 34 fixed in advance is supported on the lower surface of the connector terminal support wall 17 as described above. Further, the tip side of the wire member 12 is so inserted into the wire insertion portion 15 that the wire sealing member 35 is press-fit into the wire insertion portion 15. Further, the tip side of the wire member 12 is so inserted into the wire insertion portion 15 that the seal retainer 36 is fixed inside the opening end of the wire insertion portion 15.

Figure 3:
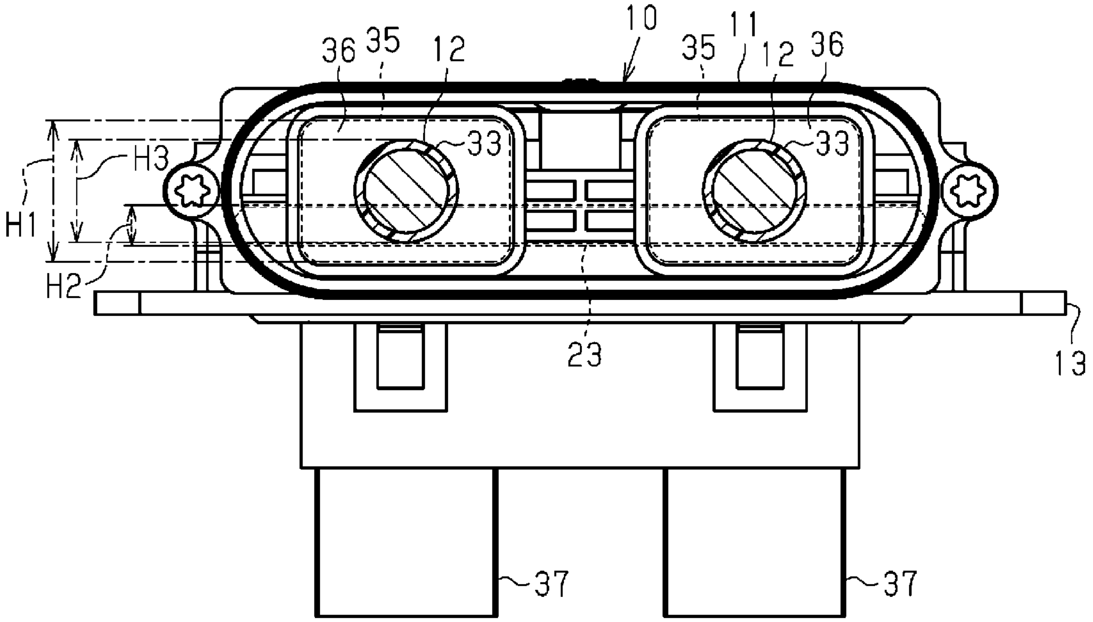
FIG. 3 is a front view of the wiring harness with connector of the one embodiment and the mating connector.

As shown in FIGS. 2 and 3, in this embodiment, a range H2 in the height direction of the connector sealing member 23 is set to overlap within a range H1 in the height direction of the wire sealing member 35. Further, in this embodiment, the range H2 in the height direction of the connector sealing member 23 is set to overlap within a range H3 in the height direction of the wire member 12 inserted in the wire insertion portion 15. That is, in this embodiment, the coupling tube portion 18 extending downward from the communicating portion 16 is provided at a position overlapping the wire insertion portion 15 in the height direction by providing the communicating portion 16 on an upper side of the wire insertion portion 15 in the height direction, and the connector sealing member 23 is provided on the connector fitting portion 22 of the coupling tube portion 18. In this way, the overlapping arrangement of the range H2 in the height direction of the connector sealing member 23 within the range H1 in the height direction of the wire sealing member 35 is realized as described above. Further, the overlapping arrangement of the range H2 in the height direction of the connector sealing member 23 within the range H3 in the height direction of the wire member 12 inserted in the wire insertion portion 15 is realized.

Further, in this embodiment, the terminal member 19 of the mating connector 13 includes a terminal 37 bent into an L shape to face the connector terminal 34 and coil terminals 38 arranged on the upper surface of the terminal 37.

Next, functions of the wiring harness with connector 10 configured as described above are described.

The connector 11 of the above wiring harness with connector 10 is lowered from above the mating connector 13 to fit the connector fitting portion 22 to the mating fitting portion 21 via the connector sealing member 23, thereby being coupled and fixed to the mating connector 13. In the coupled and fixed state, the coil terminals 38 are pressed into contact with the terminals 37 and the connector terminals 34 while being sandwiched and resiliently deformed by the terminals 37 and the connector terminals 34, whereby the terminals 37 are electrically connected to the connector terminals 34 and, eventually, the cores 31 of the wire members 12.

Next, effects of this embodiment are described below.

(1) The range H2 in the height direction of the connector sealing member 23 for sealing between the connector fitting portion 22 and the mating connector 13 is set to overlap within the range H1 in the height direction of the wire sealing member 35 for sealing between the wire member 12 and the wire insertion portion 15. Thus, a height of the connector 11 can be reduced and the connector 11 and the wiring harness with connector 10 can be thinned That is, in a simple L-shaped connector, a wire sealing member and a connector sealing member are stacked in a height direction to make the connector thick in the height direction. However, the connector 11 and the wiring harness with connector 10 can be thinned by avoiding this.

(2) Since the range H2 in the height direction of the connector sealing member 23 is set to overlap within the range H3 in the height direction of the wire member 12 inserted in the wire insertion portion 15, the height of the connector 11 can be reduced and the connector 11 and the wiring harness with connector 10 can be thinned (3) Since the connector terminal 34 is in the form of a flat plate and so arranged that the plate thickness direction thereof is aligned with the height direction (vertical direction in FIG. 2), the height of the connector 11 can be reduced and the connector 11 and the wiring harness with connector 10 can be thinned while a cross-sectional area of the connector terminal 34 is secured. Note that the cross-sectional area of the connector terminal 34 is an area of a surface of the connector terminal 34 cut by a plane orthogonal to a direction of a current flowing in the connector terminal 34. A minimum cross-sectional area of the connector terminal 34 at which abnormal heat generation and the like do not occur is determined according to the amount of a flowing current. Unless such a minimum cross-sectional area is considered, the height of the connector 11 can also be reduced, simply using a thin wire material or the like as the connector terminal 34. In contrast, in the above configuration, the height of the connector 11 can be reduced and the connector 11 and the wiring harness with connector 10 can be thinned while the minimum cross-sectional area of the connector terminal 34 at which abnormal heat generation and the like do not occur is secured. Further, since the connector terminal 34 is electrically connected to the facing terminal 37 via the coil terminals 38, a terminal insertion margin in the height direction is not necessary as compared to the case where the connector terminal 34 and the terminal 37 are a male terminal and a female terminal to be inserted and detached in the height direction. Therefore, the connector 11 and the wiring harness with connector 10 can be thinned (4) The connector terminal 34 is connected to the core 31 on the side of the squeezed portion 31*b* in the core 31 of the wire member 12 distant from the connector opening 20 (i.e. upper side in FIG. 2) in the height direction (vertical direction in FIG. 2). Accordingly, a wide space can be secured on a side closer to the connector fitting portion 22 than the connector terminal 34. Thus, the connector sealing member 23 can be brought closer to a central side of the wire sealing member 35 in the height direction of the wire sealing member 35. That is, the range H1 in the height direction of the wire sealing member 35 and the range H2 in the height direction of the connector sealing member 23 can be more easily overlapped. Therefore, the connector 11 and the wiring harness with connector 10 can be more thinned.

This embodiment can be modified and carried out as follows. This embodiment and the following modifications can be carried out in combination without technically contradicting each other.

Although the squeezed portion 31*b* (see FIG. 2) of the core 31 is formed in a center of the circular cross-section portion 31*a* in the height direction in the above embodiment, there is no limitation to this and a squeezed portion may be formed at another position.

Figure 4:
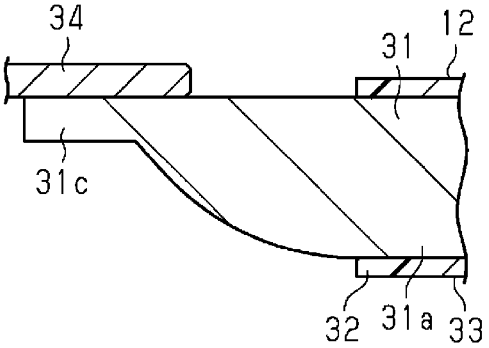
FIG. 4 is a section showing a core of another example.

For example, as shown in FIG. 4, a squeezed portion 31*c* may be formed to be flush with a surface (upper surface in FIG. 4) of the circular cross-section portion 31*a* on the side distant from the connector opening 20 (see FIG. 2) in the height direction (vertical direction in FIG. 4). With this arrangement, a wider space can be secured on the side closer to the connector fitting portion 22 than the connector terminal 34. Thus, the connector sealing member 23 can be brought closer to the central side of the wire sealing member 35 in the height direction of the wire sealing member 35. That is, the range H1 in the height direction of the wire sealing member 35 and the range H2 in the height direction of the connector sealing member 23 are more easily overlapped. Therefore, the connector 11 and the wiring harness with connector 10 can be more thinned.

Further, the squeezed portion 31*b* may be, for example, so formed that a surface near the connector opening 20 is more distant from the connector opening 20 than a center axis of the core 31 in the height direction.

Although the entire range H2 in the height direction of the connector sealing member 23 is set to overlap within the range H1 in the height direction of the wire sealing member 35 in the above embodiment, there is no limitation to this and the range H2 may be set to partially overlap. Also by this arrangement, the connector 11 and the wiring harness with connector 10 can be thinned as compared to the case where the ranges do not overlap.

Although the entire range H2 in the height direction of the connector sealing member 23 is set to overlap within the range H3 in the height direction of the wire member 12 inserted in the wire insertion portion 15 in the above embodiment, there is no limitation to this and the range H2 may be set to partially overlap or set not to overlap at all.

Although the connector terminal 34 is in the form of a flat plate and so arranged that the plate thickness direction thereof is aligned with the height direction (vertical direction in FIG. 2) in the above embodiment, there is no limitation to this. For example, the connector terminal 34 may be so arranged that the plate thickness direction is not aligned with the height direction or may have a shape other than the flat plate shape.

Although the connector terminal 34 is connected to the core 31 on the side of the squeezed portion 31*b* in the core 31 of the wire member 12 distant from the connector opening 20 (i.e. upper side in FIG. 2) in the height direction (vertical direction in FIG. 2) in the above embodiment, there is no limitation to this. For example, the connector terminal 34 may be connected on a side near the connector opening 20 (i.e. lower side in FIG. 2).

Although the wire member 12 is the wire 33 including the core 31 and the insulation coating 32 covering the outer periphery of the core 31 in the above embodiment, there is no limitation to this. The wire member 12 may have another configuration including the wire 33 or may be a wire member including an electromagnetic shielding member covering the outer surface of the wire 33.

Although the two wire members 12 are used in the above embodiment, there is no limitation to this and one, three or more wire members may be used.

Although the coil terminals 38 are provided on the terminal 37 in the above embodiment, there is no limitation to this and the coil terminals 38 may be provided on the connector terminal 34.

The height direction in the above embodiment may be called an inserting direction of the mating connector 13 into the connector 11. A direction orthogonal to the height direction in the above embodiment may be called an inserting direction of the wire members 12 into the connector 11. The inserting direction of the wire members 12 into the connector 11 in the above embodiment may indicate a longitudinal direction of the wire members 12 or the cores 31. In the above embodiment, the inserting direction of the mating connector 13 into the connector 11 is orthogonal to the longitudinal direction of the wire members 12 or the cores 31.

The inserting direction of the wire members 12 into the connector 11 may be a first direction, a longitudinal direction of the connector 11 or a longitudinal direction of the wiring harness 10. The inserting direction of the mating connector 13 into the connector 11 may be a second direction orthogonal to the first direction, a height direction of the connector 11 or a height direction of the wiring harness 10. A third direction orthogonal to the first and second directions may be a depth direction of the connector 11 or a depth direction of the wiring harness 10.

The range H1 of the above embodiment may be called an occupied range of the sealing member 35 in the second direction when the connector 11 is viewed from the third direction. The range H1 of the above embodiment corresponds to a radial dimension of the sealing member 35 in the second direction, a maximum dimension of the sealing member 35 in the second direction when the connector 11 is viewed from the third direction or an opening dimension of the wire insertion portion 15 in the second direction when the connector 11 is viewed from the third direction.

In the above embodiment, the wire sealing member 35 may include two radially outer side surface parts, which are possibly an upper side surface part and a lower side surface part of the wire sealing member 35 and separated from each other in the second direction. The range H1 of the above embodiment can be, for example, defined by the two radial side surface parts of the sealing member 35 separated from each other in the second direction.

The range H2 of the above embodiment may be called an occupied range of the connector sealing member 23 in the second direction when the connector 11 is viewed from the third direction. The range H2 of the above embodiment corresponds to an axial dimension of the connector sealing member 23 or a maximum dimension of the connector sealing member 23 in the second direction when the connector 11 is viewed from the third direction.

In the above embodiment, the connector sealing member 23 may have two annular end surfaces, which are possibly the upper end surface and the lower end surface of the connector sealing member 23. The range H2 of the above embodiment can be, for example, defined by the upper and lower end surfaces of the connector sealing member 23.

The range H3 of the above embodiment may be called an occupied range of the wire member 12 in the second direction when the connector 11 is viewed from the third direction. The range H3 of the above embodiment corresponds to a diameter of the wire member 12, a radial dimension of the wire member 12 in the second direction or a maximum dimension of the wire member 12 in the second direction when the connector 11 is viewed from the third direction.

In the above embodiment, the wire member 12 may have an upper side surface or uppermost position and a lower side surface or lowermost position of the wire member 12 in the wire insertion portion 15. The range H3 of the above embodiment can be, for example, defined by the upper and lower side surfaces of the wire member 12 in the wire insertion portion 15.

In the above embodiment, the connector 11 may be called a flat connector or low-profile connector having a height smaller than a depth. The height of the connector 11 may be smaller than a length of the connector 11.

The present disclosure includes the following implementation examples. Reference signs of some of constituent elements of the embodiment are added not for limitation, but for understanding assistance.

[Addendum 1] A connector (11) according to one or more of the implementation examples of the present disclosure may be configured to electrically connect a conductive core (31) of a wire member (12) of a wiring harness (10) and a conductive terminal member (19) of a mating connector (13) and include an insulating housing (14) with a first insulating coupling portion (Ca, 15) having a first opening (15) and a second insulating coupling portion (Cb, 18) having a second opening (20), wherein:

the first opening (15) is configured to loosely receive a tip part (31*b*) of a conductive core (31) inserted into the first opening (15) from a first direction, which is a longitudinal direction of the conductive core (31), the second opening (20) is configured to loosely receive the conductive terminal member (19) of the mating connector (13) inserted into the second opening (20) from a second direction orthogonal to the first direction, a first resilient closed loop-like sealing member (35) seals the first insulating coupling portion (Ca, 15) and the wire member (12) in a liquid-tight manner with the tip part (31*b*) of the conductive core (31) loosely received by the first opening (15), a second resilient closed loop-like sealing member (23) seals the second insulating coupling portion (Cb, 18) and the mating connector (13) in a liquid-tight manner with the conductive terminal member (19) of the mating connector (13) loosely received by the second opening (20), the first resilient closed loop-like sealing member (35) includes two radially outer side surface parts separated from each other in the second direction and an occupied range (H1) of the first resilient closed loop-like sealing member (35) in the second direction is defined by the two radially outer side surface parts of the first resilient closed loop-like sealing member (35), the second resilient closed loop-like sealing member (23) has a first annular end surface and a second annular end surface, which are both end surfaces of the second resilient closed loop-like sealing member (23), and an occupied range (H2) of the second resilient closed loop-like sealing member (23) in the second direction is defined by the first and second annular end surfaces, and the occupied range (H2) of the second resilient closed loop-like sealing member (23) overlaps the occupied range (H1) of the first resilient closed loop-like sealing member (35) in the second direction when the connector (11) is viewed from a third direction orthogonal to the first and second directions.

[Addendum 2] In several implementation examples, the first annular end surface of the second resilient closed loop-like sealing member (23) is located between the two radially outer side surface parts of the first resilient closed loop-like sealing member (35) in the second direction.

[Addendum 3] In several implementation examples, the first and second annular end surfaces of the second resilient closed loop-like sealing member (23) are located between the two radially outer side surface parts of the first resilient closed loop-like sealing member (35) in the second direction.

[Addendum 4] In several implementation examples, the mating connector (13) may include a coupling tube portion (21) surrounding the conductive terminal member (19) and the second resilient closed loop-like sealing member (23) may be mounted on an outer side surface of the coupling tube portion (21).

[Addendum 5] In several implementation examples, the first resilient closed loop-like sealing member (35) may be mounted on an outermost surface of the wire member (12) of the wiring harness (10).

[Addendum 6] In several implementation examples, the connector (11) may be configured as a flat connector having a dimension in the second direction smaller than a dimension in the third direction.

It would be apparent to a person skilled in the art that the present invention may be embodied in other specific forms without departing from the technical concept thereof. For example, some of the components described in the embodiment (or one or more modes thereof) may be omitted or several components may be combined. The scope of the present invention should be determined together with the full range of equivalents, to which claims are entitled, by reference to appended claims.

LIST OF REFERENCE NUMERALS

10 . . . wiring harness
11 . . . connector
12 . . . wire member
13 . . . mating connector
15 . . . wire insertion portion
19 . . . terminal member
20 . . . connector opening
22 . . . connector fitting portion
23 . . . connector sealing member
31 . . . core
31*a* . . . circular cross-section portion
31*c* . . . squeezed portion

32 . . . insulation coating
33 . . . wire
34 . . . connector terminal
35 . . . wire sealing member
H1 to H3 . . . range

What is claimed is:

1. A connector comprising:

a wire insertion portion open in a direction orthogonal to a height direction of the connector to be connected to a mating connector in the height direction, a wire being partially inserted into the wire insertion portion;

a connector opening open in the height direction, a terminal of the mating connector being insertable into the connector opening to be electrically connectable to the wire; and a connector fitting portion configured to be fit to the mating connector, wherein a range in the height direction of a connector sealing for sealing between the connector fitting portion and the mating connector is set to at least partially overlap within a range in the height direction of a wire sealing for sealing between the wire and the wire insertion portion, an axis of the connector sealing in a tube shape is orthogonal to an axis of the wire sealing in a tube shape, and a bottom end of the connector sealing is disposed at a height equal to or higher in the height direction than a bottom end of the wire sealing.

2. A wiring harness, comprising:

the connector of claim 1; and the wire.

3. The wiring harness of claim 2, wherein the range in the height direction of the connector sealing is set to at least partially overlap within a range in the height direction of the wire inserted in the wire insertion portion.

4. The wiring harness of claim 2, further comprising a connector terminal arranged on a back side of the connector opening, the wire being electrically connected to the connector terminal, the terminal of the mating connector being brought into contact with the connector terminal, wherein the connector terminal is in the form of a flat plate and arranged such that a plate thickness direction of the connector terminal is aligned with the height direction.

5. The wiring harness of claim 4, wherein:

the wire includes a sub-wire having a core and an insulation coating covering an outer periphery of the core, and the connector terminal is connected to the core on a side of the core distant from the connector opening in the height direction.

6. The wiring harness of claim 5, wherein the core includes a circular cross-section portion to be arranged inside the wire insertion portion and a squeezed portion formed on a side closer to a tip than the circular cross-section portion and squeezed into surface contact with the connector terminal in the form of the flat plate, and the squeezed portion is formed to be flush with a surface of the circular cross-section portion on the side distant from the connector opening in the height direction.

7. The connector of claim 1, wherein the range in the height direction of the connector sealing is set to entirely overlap within the range in the height direction of the wire sealing for sealing between the wire and the wire insertion portion.

8. The connector of claim 1, wherein the bottom end of the connector sealing is disposed at the height higher in the height direction than the bottom end of the wire sealing.

9. The connector of claim 1, wherein the connector sealing overlaps the wire in the direction orthogonal to the height direction of the connector.

* * * * *